United States Patent
Kellner et al.

(10) Patent No.: US 9,718,452 B2
(45) Date of Patent: Aug. 1, 2017

(54) BRAKE MONITORING SYSTEM AND METHOD

(71) Applicant: General Electric Company, Schenectady, NY (US)

(72) Inventors: Steven Andrew Kellner, Melbourne, FL (US); David Michael Peltz, Melbourne, FL (US); Eugene Smith, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 72 days.

(21) Appl. No.: 14/644,612

(22) Filed: Mar. 11, 2015

(65) Prior Publication Data

US 2016/0264120 A1 Sep. 15, 2016

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *B60T 17/22* | (2006.01) |
| *B60T 13/66* | (2006.01) |

(52) U.S. Cl.
CPC .......... *B60T 17/228* (2013.01); *B60T 13/665* (2013.01); *B60T 17/22* (2013.01)

(58) Field of Classification Search
None
See application file for complete search history.

(56) References Cited

U.S. PATENT DOCUMENTS

| | | | |
|---|---|---|---|
| 4,859,000 A | 8/1989 | Deno et al. | |
| 4,946,229 A | 8/1990 | Deno et al. | |
| 5,056,873 A | 10/1991 | Deno et al. | |
| 8,380,413 B2* | 2/2013 | Smith | B60T 13/665 246/187 C |
| 2002/0153765 A1* | 10/2002 | Levy | B60T 17/228 303/6.1 |
| 2009/0255329 A1* | 10/2009 | Connell | G01L 5/28 73/121 |
| 2011/0093144 A1* | 4/2011 | Goodermuth | B60T 13/665 701/20 |
| 2011/0231039 A1* | 9/2011 | Leitel | B60T 8/1893 701/19 |
| 2013/0297163 A1* | 11/2013 | Kull | B60T 7/18 701/70 |

* cited by examiner

*Primary Examiner* — Lail Kleinman
(74) *Attorney, Agent, or Firm* — Global Patent Operation; John A. Kramer (57) ABSTRACT

A brake monitoring system and method determine one or more characteristics of a conduit in a first air brake system of a first vehicle system, compare the one or more characteristics of the first air brake system with one or more designated waveform signatures, and distinguish between communication of a brake application signal that is propagated along the vehicle system through the conduit as a decrease in pressure in the conduit and a change in the pressure in the conduit that is not representative of the communication of the brake application signal based on comparing the one or more characteristics with the one or more designated waveform signatures.

4 Claims, 5 Drawing Sheets

BRAKE MONITORING SYSTEM AND METHOD

FIELD

Embodiments of the subject matter disclosed herein relate to brake systems of vehicles and vehicle systems.

BACKGROUND

Some vehicle systems include multiple vehicles coupled together. These vehicle systems can include trains or rail vehicle consists having a brake pipe that extends along the length of the vehicle system. The brake pipe carries air used to engage or disengage air brakes of the vehicle system. When air pressure in the pipe is above a threshold, the air brakes are disengaged. When the air pressure drops below the threshold, the air brakes may be engaged to slow or stop movement of the vehicle system.

Engagement of the air brakes in multiple vehicles of the vehicle system may be coordinated by dropping the pressure in the brake pipe by a designated amount. This drop in pressure can propagate along the length of the pipe with a well-defined leading edge. As different vehicles identify the pressure drop, the vehicles engage the air brakes.

As vehicle systems become longer, the well-defined drop in pressure in the brake pipe that is used to engage the brakes may get distorted and not be detected by the vehicles that are very far from the vehicle that initiated the pressure drop. For example, if the pressure drop is initiated at a front or leading end of a train, the locomotives or rail cars at the back or trailing end of the train may not see a sharp well-defined drop in brake pipe pressure but rather a slow reducing brake pipe pressure that may result is a lower brake reduction than was initiated by the front of the train. The pressure in the brake pipe at the back or trailing end of the train may be sufficiently low that the pressure drop is undetected. As a result, the brakes of these locomotives or rail cars may not be engaged when needed.

Additionally, longer vehicle systems may introduce increased fluctuations, or noise, in measurements of the pressures in the brake pipe. These fluctuations can prevent or interfere with the detection of pressure drops used to instruct the vehicles to engage the air brakes. For example, large fluctuations can cause a vehicle to incorrectly identify noise as an instruction to engage the air brakes.

BRIEF DESCRIPTION

In one embodiment, a method (e.g., for monitoring a brake system) includes determining one or more characteristics of a conduit in a first air brake system of a first vehicle system, comparing the one or more characteristics of the first air brake system with one or more designated waveform signatures, and distinguishing between communication of a brake application signal that is propagated along the vehicle system through the conduit as a decrease in pressure in the conduit and a change in the pressure in the conduit that is not representative of the communication of the brake application signal based on comparing the one or more characteristics with the one or more designated waveform signatures.

In another embodiment, a system (e.g., a brake monitoring system) includes one or more processors configured to determine one or more characteristics of a conduit in a first air brake system of a first vehicle system and to compare the one or more characteristics of the first air brake system with one or more designated waveform signatures. The one or more processors also can be configured to distinguish between communication of a brake application signal that is propagated along the vehicle system through the conduit as a decrease in pressure in the conduit and a change in the pressure in the conduit that is not representative of the communication of the brake application signal based on comparing the one or more characteristics with the one or more designated waveform signatures.

In another embodiment, a method (e.g., for monitoring a brake system) includes monitoring changes in air pressure and changes in air flow in a conduit of an air brake system of a vehicle system having two or more vehicles coupled with each other, comparing the changes in the air pressure with one or more designated pressure waveform signatures and comparing the changes in the air flow with one or more designated air flow waveform signatures, determining a braking effectiveness of the air brake system based at least in part on comparing the changes in the air pressure with the one or more designated pressure waveform signatures and comparing the changes in the air flow with the one or more designated air flow waveform signatures, and modifying operation of the vehicle system in response to determining a change in the braking effectiveness of the air brake system.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Embodiments of the subject matter described herein provide for systems and methods that determine airbrake performance for vehicle systems having two or more vehicles that travel together along a route. The vehicle systems may use higher fidelity sensors and/or different sensors than are currently used by vehicle systems in order to determine and characterize airbrake performance more quickly and/or accurately and currently known systems and sensors. Alternatively, the vehicle systems may use one or more of the same sensors but analyze the data generated by these sensors in a different way in order to determine and characterize airbrake performance more quickly and/or accurately then currently known systems and sensors.

In one aspect, one or more waveforms of characteristics of a conduit (e.g., a brake pipe) in an air brake system of the vehicle system are determined. These waveforms are referred to as characteristics waveforms, and can be compared with one or more waveform signatures (also referred to as designated waveform signatures or designated signatures). The designated waveform signatures that are compared to the characteristic waveforms may be selected based on details of the vehicle system, such as length of the vehicle system, weight of the vehicle system, a temperature of the vehicle system, a type of valve used in the air brake system, a pneumatic configuration of the conduits (e.g., brake pipes) in the air brake system, or the like. Optionally, the designated waveform signatures may be selected based on environmental information, such as ambient temperature, ambient pressure, ambient humidity, or the like. For example, the vehicle conditions and/or environmental conditions in which the characteristics of the air brake system are measured may be compared to vehicle conditions and/or environmental conditions associated with different waveform signatures. The designated waveform signature or signatures associated with conditions that match the conditions of the characteristics waveform (or match the conditions more closely than one or more other, or all other, designated waveform signatures) may be selected for comparison to the characteristics waveform.

The characteristic waveforms measured from the air brake system can be compared to one or more of the designated waveform signatures in order to differentiate between brake application signals that are propagated through the air brake system (e.g., by a designated drop in pressure of the air in the air brake system) versus noise in the air brake system. The noise may be fluctuations in the pressure of their brake system that do not represent a brake application signal, are not caused by brake application signal, or that are otherwise caused by factors other than an operator manually implementing application of the brake air brake system and/or autonomous activation of the air brake system.

In one aspect, different types of sensors may be used to differentiate between brake application signals and noise in the air brake system. Using plural different types of sensors in this manner can result in a synergistic relationship is able to better analyze performance of their brake system relative to some known monitoring systems.

At least one technical effect achieved by the inventive subject matter described herein includes the ability of a vehicle system to better control brakes of the vehicle system by being able to differentiate between noise in pressure and/or air flow measurements versus receipt of a brake application signal conveyed through a brake pipe for longer vehicle systems. Additionally, another technical effect includes the ability of an operator of a vehicle system and/or the vehicle system to better understand the actual braking effectiveness of the vehicle system. Due to leaks, low temperatures, or other factors, the actual braking effectiveness (e.g., how quickly the brake system can stop the vehicle system, how much braking force the brake system actually can generate, etc.) of the vehicle system may be decreased. The operator may be unaware of this decreased braking effectiveness and, as a result, unsafe operation of the vehicle system may ensue. One or more embodiments described herein can examine characteristics of the brake pipe to better estimate or calculate the braking effectiveness of the vehicle system. This improved knowledge of the braking effectiveness can be used to better autonomously or manually control the vehicle system in a safer, more effective manner. Additionally, another technical effect includes the ability to predict impending derailment and/or mechanical decoupling between two or more vehicles in a vehicle system based on a comparison between characteristics of a brake pipe in the vehicle system and characteristics of one or more other brake pipes in similar or identical vehicle systems. This type of prediction can allow for an operator to manually change operation and/or the vehicle system to autonomously change operation of the vehicle system to prevent the derailment and/or mechanical decoupling.

Figure 1:
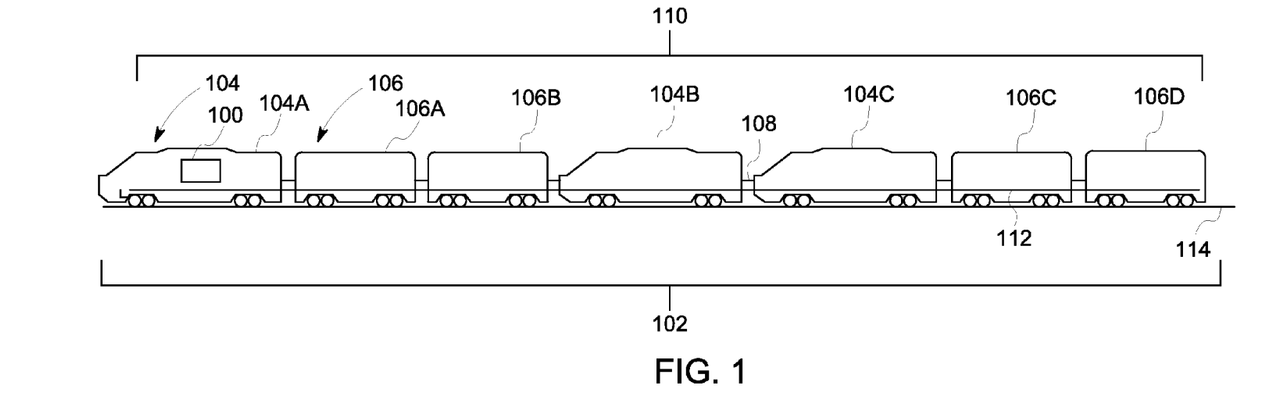
FIG. 1 illustrates a schematic diagram of a brake monitoring system onboard a vehicle system according to one embodiment.

FIG. 1 illustrates a schematic diagram of a brake monitoring system 100 onboard a vehicle system 102 according to one embodiment. The vehicle system 102 includes multiple vehicles 104, 106 that are mechanically coupled with each other, such as by couplers 108, to travel along together along a route 114. The vehicle system 102 alternatively may be referred to as a vehicle consist. The vehicles 104 may be referred to as propulsion-generating vehicles 104 and the vehicles 106 may be referred to as non-propulsion-generating vehicles 106. The vehicles 104 represent vehicles that are capable of generating propulsion or tractive effort to move the vehicles 104 in the vehicle system 102, such as locomotives, automobiles, or other types of propulsion-generating vehicles. The vehicles 106 represent non-propulsion-generating vehicles, such as rail cars, trailers, or the like. The vehicles 104 include three vehicles 104A-104C, but optionally may include a smaller or greater number of vehicles 104. The vehicles 106 include four vehicles 104A-106D, but optionally may include a larger or smaller number of vehicles 106. The arrangement and/or number of the vehicles 104 and/or vehicles 106 shown in FIG. 1 may deviate from the illustrate embodiment.

A brake system 110 of the vehicle system 102 can represent an air brake system that changes pressure of air in one or more conduits 112 extending along the vehicle system 102. The conduit 112 may represent one or more brake pipes extending along the length of the vehicle system 102, but optionally may represent other conduits. In one aspect, decreases in air pressure in the conduit 112 below a designated threshold can cause brakes onboard one or more of the vehicles 104, 106 to engage to slow and/or stop movement of the vehicle system 102 along the route 114. For example, in order to engage the brakes of the brake system 110, a reduction in air pressure in the conduit 112 may be generated as a brake application signal. This signal may propagate along the length of the vehicle system 102 through the conduit 112. For example, a controller disposed onboard the vehicle 104A may open a valve 220 (shown in FIG. 2) or otherwise open part of the conduit 112 to vent a portion but less than all of the air in the conduit 112. This venting of a portion of the air pressure can move along, or propagate, through the conduit 112 along the length of the condo 112 through other vehicles 104, 106 as a brake application signal. As a brake application signal is detected by controllers and/or brakes disposed on board the other vehicles 104, 106 in the vehicle system 102, the brakes onboard these vehicles 104, 106 may engage the brakes of the brake system 110.

For very long vehicle systems 102, such as vehicle systems 102 having a large number of vehicles 104, 106 or vehicle systems 102 that are at least 2.6 kilometers, at least three kilometers, or the like, the magnitude of the pressure drop that represents the brake application signal may become attenuated over the length of the very long conduit 112. For example, the amount of decrease in pressure in the air in the conduit 112 may become smaller as the brake application signal travels farther from the vehicle 104 that initiated the brake application signal. As the magnitude of the brake application signal becomes more attenuated over longer lengths of the conduit 112, the brake application signal may be confused with or misidentified as noise in the pressures measured by pressure sensors disposed along the length of the conduit 112.

Additionally or alternatively, pressure sensors disposed far from the vehicle 104 that initiated the brake application signal may be tuned to treat relatively small decreases in the air pressure in the conduit 112 as receipt of the brake application signal. Consequently, as the magnitude of the brake application signal becomes more and more attenuated, the sensors may incorrectly identify noise in the measured air pressures as being receipt of a brake application signal. The incorrect identification of noise as a brake application signal can cause brakes in the vehicles 104, 106 that are located far from the vehicle 104 that initiated the brake application signal to improperly engage brakes when no brake application signal was supplied.

In order to prevent brake application signals from being incorrectly confused with noise in the pressure measurements of the conduit 112, one or more embodiments of the monitoring systems and/or methods described herein can use designated waveform signatures of characteristics of the brake system 110, higher fidelity sensors, and/or combinations of two or more different types of sensors to improve the ability to distinguish between noise and brake application signals. Optionally, monitoring systems and/or methods described herein can use the designated waveform signatures of characteristics of the brake system 110 to determine an effectiveness of the braking system 110 in slowing and/or stopping movement of the vehicle system 102. Additionally or alternatively, the monitoring systems 100 and/or methods described herein can use the designated waveform signatures and waveforms of characteristics of the brake system 110 to predict when a mechanical decoupling of two or more of the vehicles 104, 106 and/or a derailment of the vehicle system 102 is likely to occur or will occur. In one aspect, the monitoring systems 100 and/or methods described herein can identify locations of leaks along the conduit 112 of the brake system 110.

Figure 2:
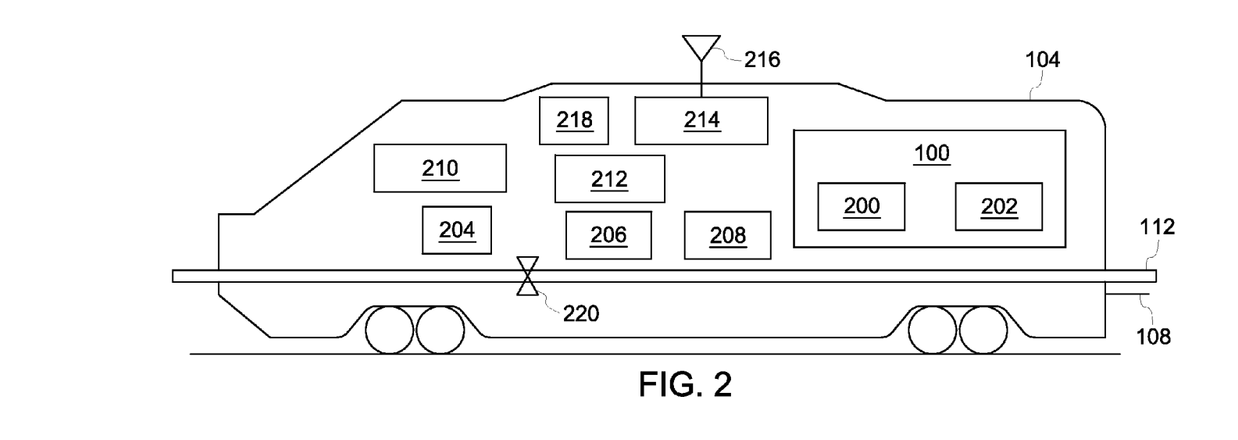
FIG. 2 schematically illustrates one of the vehicles shown in FIG. 1 according to one embodiment.

FIG. 2 schematically illustrates one of the vehicles 104 shown in FIG. 1 according to one embodiment. The vehicle 104 includes the brake monitoring system 100 that, among other things, distinguishes between noise in measurements of one or more characteristics of the conduit 112 and propagation or receipt of a brake application signal through the conduit 112, determines an effectiveness of the braking system 112 of the vehicle system 102 based on characteristics of the brake system 110, predicts mechanical separations of the vehicles 104, 106 and/or derailments of the vehicle system 102, and/or identifies leaks in the brake system 110.

The brake monitoring system 100 includes one or more processors 200. The one or more processors 200 may collectively or individually perform the operations described herein. For example, the operations described herein may be performed by a single processor 200, the operations described herein may be performed by multiple processors 200, one or more of the operations described herein may be shared between multiple processors 200, different operations may be performed by different processors 200, or the like. The processors 200 may represent hardware circuitry or circuits that include and/or are connected with one or more electronic logic-based devices, such as electronic controllers, control units, microprocessors, or other types of processors. The brake monitoring system 100 optionally may include a memory 202, such as electronic computer-based memory. The memory 202 may include or represent a computer hard drive, a computer disk drive, an optical drive, a read-only memory, random access memory, or the like. The memory 202 may store one or more designated waveform signatures, characteristics of the vehicle system 102 and/or other vehicle systems used to select a designated waveform signature, waveform signatures of characteristics of the conduit 112, or the like, as described herein.

At least a portion of the conduit 112 of the brake system 110 extends through and or is connected with the vehicle 104 as shown in FIG. 2. The brake system 110 includes one or more brakes 204 that are activated responsive to changes in pressure in the air (or other gases) in the conduit 112 to slow or stop movement of the vehicle system 102. For example, the brake 204 can represent one or more airbrakes of the brake system 110. The brake system 110 shown in FIG. 1 can be formed from the conduit 112 and one or more of the brakes 204 disposed onboard the vehicles 104, 106. One or more valves 220 may be fluidly coupled with the conduit 112. These valves 220 can be opened to at least partially vent the conduit 112 to decrease pressure in the conduit 112 and/or closed to allow pressure in the conduit 112 to increase (e.g., due to operation of a compressor fluidly coupled with the conduit 112).

The monitoring system 100 includes or is operably connected with (e.g., able to communicate with via one or more wired and/or wireless connections) one or more sensors 206, 208. The sensors 206, 208 represent devices that measure characteristics of the conduit 112, such as pressure sensors that measure air pressures inside the conduit 112, air flow sensors that measure a rate at which air is moving in the conduit 112, temperature sensors that measure temperatures of the air in the conduit 112, humidity sensors that measure amounts of moisture in the air in the conduit 112, or the like. Optionally, one or more of the sensors 206, 208 can represent a device that measures one or more environmental conditions, such as ambient temperatures, ambient pressures, ambient humidity, or the like (e.g., conditions outside of the conduit 112). While only two sensors 206, 208 are shown, optionally, a different number of sensors 206, 208 may be provided in one or more of the vehicles 104, 106.

In one embodiment, the sensors 206, 208 may be different types of sensors 206, 208. Different types of sensors 206, 208 include sensors that measure different characteristics (e.g., pressure, air flow, temperature, etc.), that measure the same characteristic in a different manner (e.g., sensors that measure pressure using measurements of force or strain, measurements of capacitance, measurements of resonant frequencies, measurements of thermal conductivity, or the like), or that exhibit other differences.

The sensors 206, 208 can measure the characteristics and output data signals to report the measured characteristics to the monitoring system 100. The monitoring system 100 can receive the characteristics from the sensors 206, 208 and generate waveforms of the characteristics. The monitoring system 100 can receive characteristics from and generate waveforms of characteristics received from sensors 206, 208 disposed onboard the same vehicle 104 as the monitoring system 100 and/or sensors 206, 208 disposed onboard other vehicles 104, 106 in the same vehicle system 102. The waveforms of the characteristics represent changes in the characteristics with respect to time, as described below.

The vehicle 104 can include one or more input and/or output devices 210 ("I/O Device(s)" as shown in FIG. 2) that receive information from an operator of the vehicle 104 and/or vehicle system 102 and/or that present information to the operator and/or another person or location. The devices 210 can represent one or more electronic monitors, displays, touchscreens, keyboards, an electronic mouse, stylus, speaker, throttle, brake handle or other actuation device used to engage or release the brake 204, or the like.

A controller 212 of the vehicle 104 controls operations of the vehicle 104 and/or the vehicle system 102. The controller 212 can represents hardware circuits and/or circuitry that include and/or are connected with one or more processors. The controller 212 can control a propulsion system (not shown, but may include one or more engines, motors, batteries, or the like) that generates tractive effort to propel the vehicle 104 and/or vehicle system 102, the brake system 110, the brake 204, the monitoring system 100, or the like.

A communication unit 214 ("Comm Unit" shown in FIG. 2) represents hardware circuits and/or circuitry that include and/or are connected with one or more processors for communicating with one or more other devices disposed off-board the vehicle 104. The communication unit 214 can be connected with transceiving circuitry 216 (e.g., an antenna) for wireless communication and/or can be connected with one or more wired connections (e.g., cables, bus, wires, multiple unit cables, or the like) for communicating with other vehicles in the vehicle system 102 or with other locations.

An energy management system 218 ("EMS" shown in FIG. 2) may be disposed onboard one or more of the vehicles 104, 106 in the vehicle system 102. The energy management system 218 generates trip plans for travel of the vehicle system 102. A trip plan can designate operational settings (e.g., speeds, throttle settings, brake settings, accelerations, etc.) of the vehicle 104 and/or vehicle system 102 as a function of time and/or distance along the route 114. Travel according to the operational settings of the trip plan can cause the vehicle 104 and/or vehicle system 102 to consume less fuel, generate fewer emissions, and/or generate less audible noise than travel according to operational settings that differ from the trip plan. As described herein, the monitoring system 100 may determine that the effectiveness of the brake system 110 may be decreased. For example, the monitoring system 100 may determine that the vehicle system 102 needs to travel slower in order to be able to slow or stop before a designated location, that the vehicle system 102 needs a longer distance to stop than the stopping distance on which the trip plan was created, or the like. Based on this decrease in braking effectiveness that is identified by the monitoring system 100, the energy management system 218 may revise the trip plan to account for the decrease in braking effectiveness.

Figure 3:
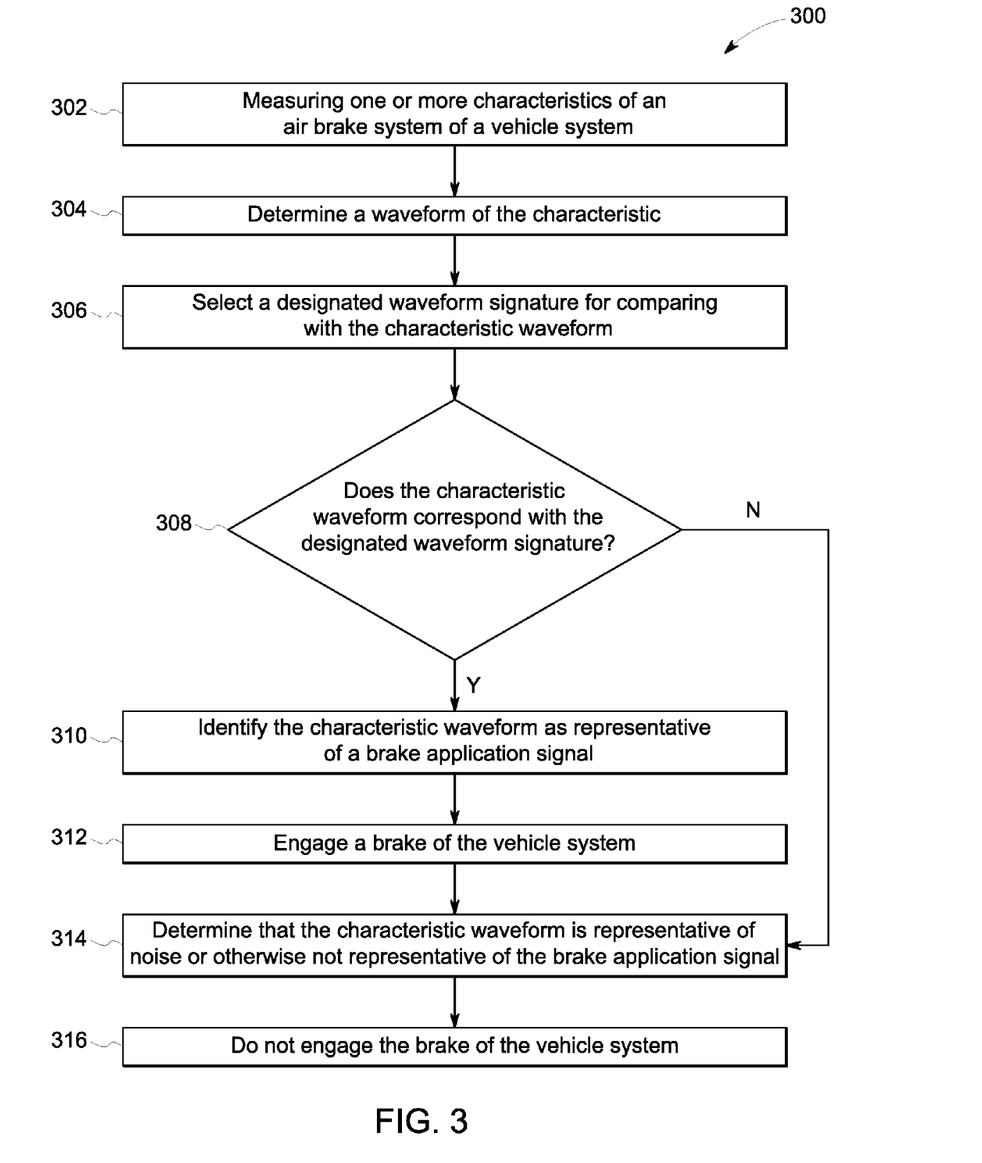
FIG. 3 illustrates one embodiment of a flowchart of a method for monitoring a brake system of a vehicle or vehicle system.

FIG. 3 illustrates one embodiment of a flowchart of a method 300 for monitoring a brake system of a vehicle or vehicle system. The method 300 may be practiced by one or more embodiments of the monitoring systems 100 described herein. At 302, one or more characteristics of the air brake system 110 are monitored. These characteristics can include air pressures inside the conduit 112 of the air brake system 110, air flows (e.g., rates of air movement) in the conduit 112, or other characteristics (e.g., temperatures, humidity, etc.). The characteristics can be measured by the sensors 206, 208 onboard one or more vehicles 104, 106 and reported to the monitoring system 100.

At 304, one or more waveforms of one or more of these characteristics are determined A waveform may represent changes or variations in a characteristic with respect to time and/or distance along the route 114. The waveform may be referred to as a characteristic waveform that represents how a characteristic of the brake system 110 (e.g., air pressure, air flow rate, etc.) changes over time and/or distance. The waveform may or may not be graphically presented (e.g., on the I/O device 210).

Figure 4:
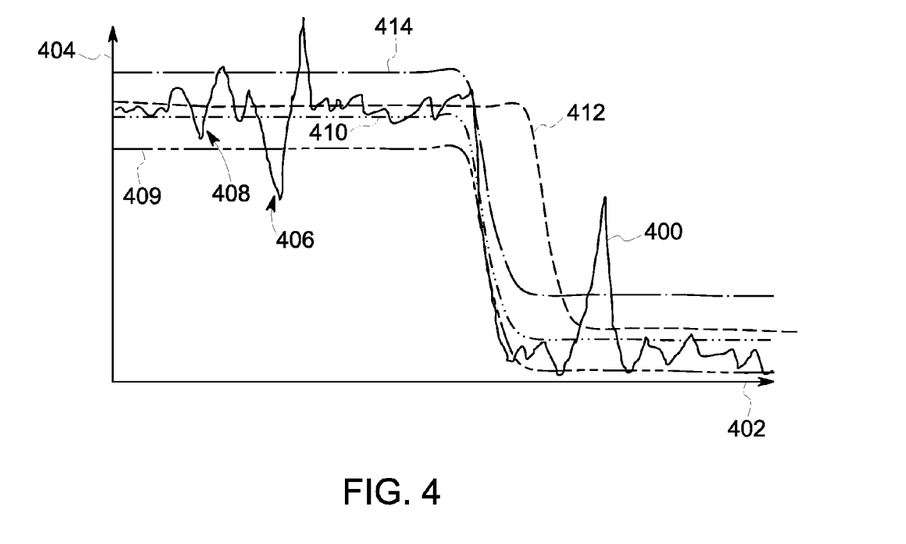
FIG. 4 illustrates one example of a characteristic waveform of the brake system shown in FIG. 1.

FIG. 4 illustrates one example of a characteristic waveform 400 of the brake system 110 shown in FIG. 1. The waveform 400 is shown alongside a horizontal axis 402 representative of time and/or distance along the route 114 and a vertical axis 404 representative of a magnitude of the characteristic represented by the waveform 400. For example, the waveform 400 may represent pressure in one or more locations of the conduit 112. As a result, the vertical axis 404 can represent different pressures for the waveform 400.

Figure 5:
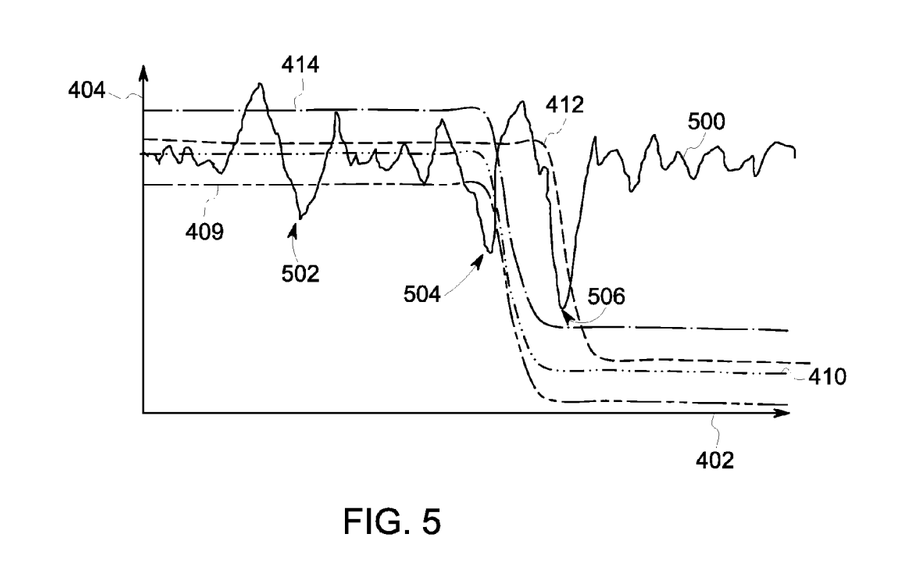
FIG. 5 illustrates another example of a characteristic waveform of the brake system shown in FIG. 1.

FIG. 5 illustrates another example of a characteristic waveform 500 of the brake system 110 shown in FIG. 1. The waveform 500 is shown alongside the horizontal axis 402 and the vertical axis 404 described above in connection with FIG. 4. As shown in FIGS. 4 and 5, the waveforms 400, 500 can include a significant amount of noise, or variations in the magnitude of the waveforms 400, 500 over relatively short lengths of the horizontal axis 402. Depending on the sensitivity of the air brake system 110, one or more decreases in the waveform 400, 500 may be detected by the air brake system 110 as receipt of a brake application signal if only the waveforms 400, 500 or the characteristics of the waveforms 400, 500 are used to detect receipt of a brake application signal. As a result, one or more brakes 204 of the brake system 110 may be engaged due to noise and not receipt of a brake application signal.

For example, decreasing waveform segments 406, 408 in the waveform 400 and decreasing waveform segments 502, 504, 506 in the waveform 500 may be interpreted by the brake system 110 as receipt of a brake application signal. The brake 204 in one or more vehicles 104, 106 may then be actuated as a response thereto. But, only the waveform 400 may represent an actual propagation of a brake application signal along the conduit 112, while the waveform 500 does not represent propagation of a brake application signal. Consequently, the variations in the pressure in the conduit 112 represented by the waveform 500 may incorrectly be identified as a brake application signal and one or more brakes 204 may be activated in response thereto, even though no brake application signal was communicated.

Returning to the description of the method 300 shown in FIG. 3, at 306, a designated waveform signature is selected for comparing to the characteristic waveform. Several different waveform signatures may represent changes in characteristics when a brake application signal is received for different vehicle conditions and/or environmental conditions. For example, for a first vehicle condition and/or a first environmental condition, a first waveform signature can represent changes in pressure from receipt of a brake application signal. A different, second waveform signature can represent changes in pressure from receipt of a brake application signal for a different, second vehicle condition and/or a different, second environmental condition. The vehicle conditions associated with the different waveform signatures can represent different lengths of vehicle systems 102, different types of brake systems 110, different sizes (e.g., lengths, diameters, etc.) of the conduits 112, different types of valves 220 connected with the conduits 112, different configurations of the conduits 112 (e.g., the couplings between different segments of the conduits 112 in the same vehicle system 102, the branches or other structures of the conduits 112, etc.), or other characteristics of the vehicles 104, 106, vehicle systems 102, and/or conduits 112. The environmental conditions associated with the different waveform signatures can represent different ambient temperatures, different temperatures inside the conduits 112, different ambient humidity, etc.

For a vehicle system 102 traveling along a route 114, the vehicle conditions of the vehicle system 102 and/or the environmental conditions around and/or in the vehicle system 102 can be determined (e.g., from a trip manifest, as input by the operator, or as otherwise determined). These conditions can then be compared to vehicle conditions and/or environmental conditions associated with different designated waveform signatures. The conditions associated with a designated waveform signature that match the conditions of the vehicle system 102 (or that match the conditions more closely than one or more, or all, other designated waveform signatures) may be selected as a selected waveform signature.

For example, the length of the vehicle system 102, the type (e.g., brand name) of the valves 220 in the vehicle system 102, the ambient temperature, and the temperature inside the conduit 112 of the vehicle system 102 can be compared to the conditions of different waveform signatures in order to identify which of the waveform signatures are associated with the same or similar length of the vehicle system 102 (e.g., the same length or within a threshold such as 5%, 10%, 20%, or the like), the same type of valves 220 as the vehicle system 102, the same or similar ambient temperature as the vehicle system 102 is exposed to (e.g., the same temperature or within a threshold such as 0.5%, 1%, 3%, or the like), and/or the same or similar conduit temperature as the vehicle system 102 (e.g., the same temperature or within a threshold such as 0.5%, 1%, 3%, or the like). One or more designated waveform signatures having conditions that are the same or similar as the conditions of the vehicle system 102 and/or the environmental conditions to which the vehicle system 102 is exposed may be identified as selected waveform signatures.

In one aspect, different designated waveform signatures may be selected for different locations of vehicles 104, 106 in the vehicle system 102. For example, the designated waveform signature that is selected for comparison with the characteristics measured at the vehicle 104B may be different from the designated waveform signature that is selected for comparison with the characteristics measured at the vehicle 104C. This may be at least partially due to the fact that different vehicles 104 in the same vehicle system 102 may experience different changes in characteristics of the conduit 112 during receipt of a brake application signal. For example, vehicles 104C that are farther from the vehicle 104A that initiates the brake application signal may experience a smaller change in pressure during receipt of the signal than vehicles 104B that are closer to the vehicle 104A.

With respect to the characteristic waveforms 400, 500 shown in FIGS. 4 and 5, several different designated waveform signatures 409, 410, 412, 414 are shown alongside the horizontal and vertical axes 402, 404. These waveform signatures 409, 410, 412, 414 can be associated with different sets of vehicle conditions and/or environmental conditions. While two or more of the waveform signatures may be associated with one or more of the same (e.g., common) vehicle conditions and/or environmental conditions, these waveform signatures may also be associated with one or more conditions that differ from the other waveform signatures and/or that are associated with a different location in a vehicle system.

The waveform signatures may be determined based on measurements made in vehicle systems 102 having the vehicle conditions and/or exposed to the environmental conditions associated with the different waveform signatures. For example, pressure measurements may be made in the conduits 112 of vehicle systems 102 having the same vehicle conditions and/or exposed to the same environmental conditions during communication of a brake application signal to generate a waveform signature to be associated with those vehicle conditions and/or environmental conditions. Similarly, pressure measurements may be made in the conduits 112 of vehicle systems 102 at different locations during communication of a brake application signal to generate waveform signatures associated with those different locations in a vehicle system 102. The waveform signatures may represent these pressure measurements, averages of the pressure measurements, medians of the pressure measurements, root mean squares of the pressure measurements, or the like. Alternatively, the pressure measurements used to generate the waveform signatures may be estimated, calculated, or otherwise modeled instead of being directly measured.

Depending on which of the waveform signatures are associated with conditions that match or more closely match conditions of the vehicle system 102 used to generate the characteristic waveform 400 or 500, a waveform signature may be selected for comparison to the characteristic waveform 400 or 500.

At 308, a determination is made as to whether or not the characteristic waveform of the vehicle system corresponds with the selected waveform signature. For example, the pressures represented by the characteristic waveforms 400, 500 may be compared to the pressures represented by the selected waveform signature 409, 410, 412, 414 at one or more times and/or distances along the horizontal axis 402. If differences between the waveforms and the waveform signatures are less than a threshold or if the magnitudes of the pressures represented by the characteristic waveforms are within a range of the pressures of the selected waveform signature (e.g., within 1%, 3%, 5%, 10% or another value), then the characteristic waveform may correspond with the selected waveform signature. As a result, flow of the method 300 can proceed toward 310. Otherwise, flow of the method 300 can proceed toward 314.

With respect to the example shown in FIG. 4, the differences between the characteristic waveform 400 and the waveform signature 410 may be sufficiently small that the characteristic waveform 400 corresponds to or matches the waveform signature 410. If the waveform signature 410 is the selected waveform signature, then flow of the method 300 can proceed to 310. On the other hand, the differences between the characteristic waveform 400 and the waveform signatures 409, 412, 414 may be sufficiently large that the characteristic waveform 400 does not correspond to or match the waveform signatures 408, 412, 414. If the waveform signature 409, 412, or 414 is the selected waveform signature, then flow of the method 300 can proceed to 314.

With respect to the example shown in FIG. 5, the differences between the characteristic waveform 500 and the waveform signature 412 may be sufficiently small that the characteristic waveform 500 corresponds to or matches the waveform signature 412. If the waveform signature 412 is the selected waveform signature, then flow of the method 300 can proceed to 310. On the other hand, the differences between the characteristic waveform 500 and the waveform signatures 409, 410, 414 may be sufficiently large that the characteristic waveform 500 does not correspond to or match the waveform signatures 409, 410, 414. If the waveform signature 409, 410, or 414 is the selected waveform signature, then flow of the method 300 can proceed to 314.

At 310, the characteristic waveform is identified as being representative of receipt of a brake application signal. For example, because the signature waveform associated with the same or similar vehicle conditions and/or environmental conditions and representative of a brake application signal matches or corresponds to the characteristic waveform, then the characteristic waveform is more likely to represent receipt of a brake application signal than noise in the characteristics. The selection of a waveform signature associated with conditions that match or are similar to the conditions of the vehicle system 102 and/or to which the vehicle system 102 is exposed can assist in filtering out noise from characteristics (e.g., pressures) representative of receipt of a brake application signal.

At 312, one or more brakes of the vehicle system are engaged responsive to identifying the characteristic waveform as being representative of receipt of a brake application signal. For example, the brake 204 onboard the vehicle 104 having the vehicle conditions and/or environmental conditions associated with the waveform signature that matched the characteristic waveform may be activated to slow or stop movement of the vehicle 104 and the vehicle system 102. Optionally, flow of the method 300 may return to 302.

At 314, the characteristic waveform is not identified as being representative of receipt of a brake application signal. For example, because the signature waveform associated with the same or similar vehicle conditions and/or environmental conditions and representative of a brake application signal does not match or correspond to the characteristic waveform, then the characteristic waveform is more likely to represent noise or otherwise not be representative of receipt of a brake application signal. At 316, one or more brakes of the vehicle system are not engaged responsive to identifying the characteristic waveform as not being representative of receipt of a brake application signal. Optionally, flow of the method 300 may return to 302.

In one embodiment, the braking system 110 can determine temporal delays between when a brake application signal is received by multiple vehicles 104 and/or 106 in the vehicle system 102. The monitoring system 100 can communicate with controllers onboard the vehicles 104 to determine the times at which a brake application signal is received and/or implemented by engaging brakes 204 onboard the vehicles 104. The monitoring system 100 can examine delays between when the braking application signal is received by the vehicles 104 and distances between the vehicles 104. If the braking application signal takes longer to be received by two or more vehicles 104 than the brake application signal should take (e.g., the actual time required for the drop in pressure that represents the brake application signal to move in the conduit 112 between two vehicles 104 is longer than a time calculated for the pressure drop to move between the vehicles 104), then the monitoring system 100 can identify a leak in the conduit 112 or valve 220 (or other component of the brake system 110) between the vehicles 104. This leak can be communicated to the operator via the I/O device. Optionally, the energy management system can modify operational settings of a trip plan based on identification of the leak, such as by directing the vehicle system 102 to generate brake application signals earlier than prior to identification of the leak. In one aspect, the monitoring system 100 can direct the operator and/or controller of the vehicle system 102 to increase the pressure drop used to create a brake application signal to ensure that the brake application signal is received by the vehicles 104, 106.

Figure 6:
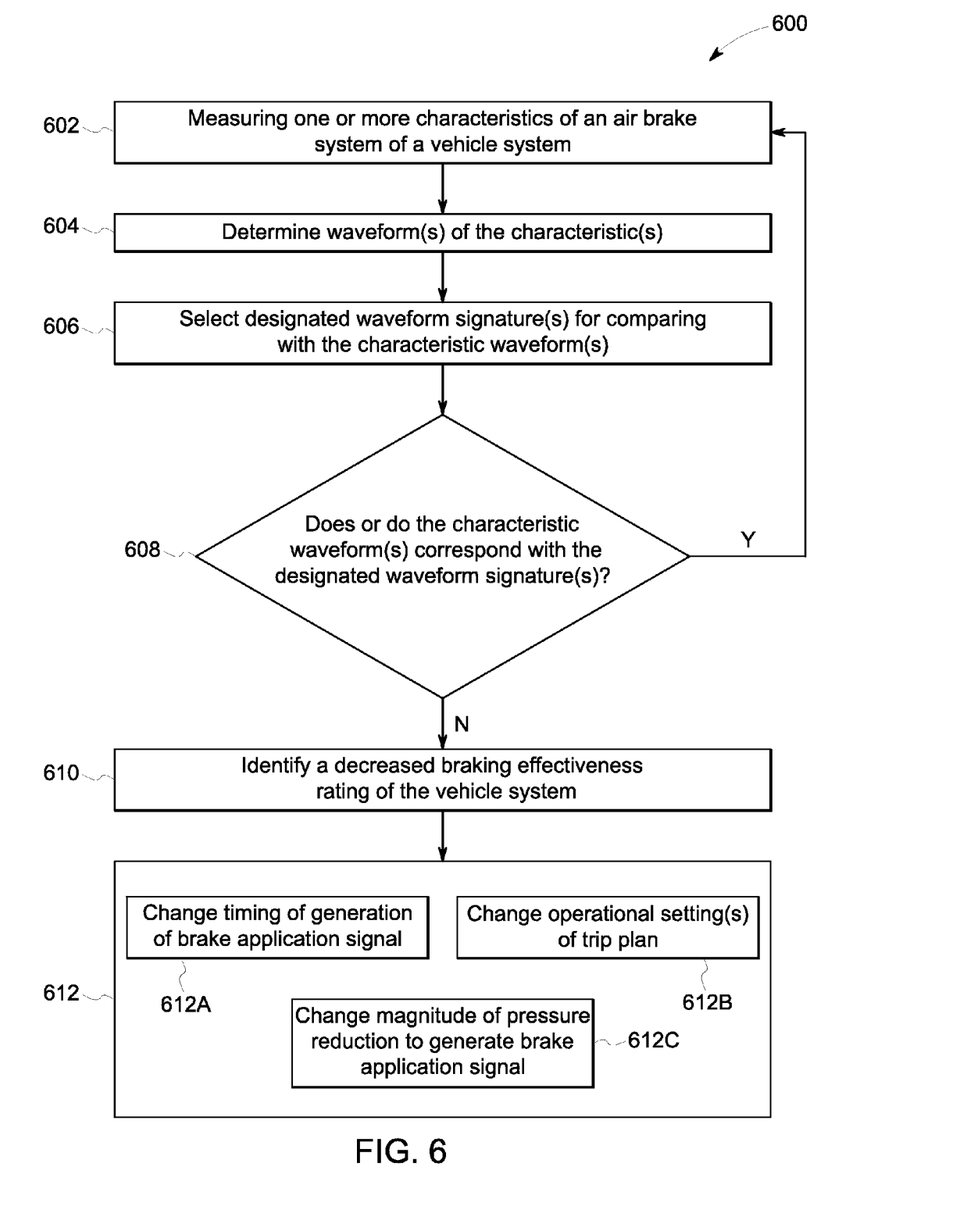
FIG. 6 illustrates one embodiment of a method for determining an effectiveness of a brake system of a vehicle or vehicle system.

FIG. 6 illustrates one embodiment of a method 600 for determining an effectiveness of a brake system of a vehicle or vehicle system. The method 600 may be practiced by one or more embodiments of the monitoring system 100 described herein to determine how effective or efficient the brake system 110 or brake 204 can be in stopping or slowing movement of the vehicle 104 or vehicle system 102. The effectiveness can be quantitatively and objectively represented by an effectiveness rating or effectiveness index. Different effectiveness ratings or indices can indicate different limitations or capabilities of the brake system 110 and/or brake 204. For example, a larger effectiveness rating can indicate that the vehicle system 102 and/or vehicle 104 can travel at a faster speed while stopping within a designated distance relative to a smaller effectiveness rating. A larger effectiveness rating may indicate that the vehicle system 102 and/or vehicle 104 can stop within a shorter distance (e.g., stopping distance) while moving at a designated speed relative to a smaller effectiveness rating. A larger effectiveness rating may indicate that the vehicle system 102 and/or vehicle 104 can stop within a designated stopping distance while moving at a designated speed with a smaller drop in air pressure in the conduit 112 relative to a smaller effectiveness rating. A larger effectiveness rating may indicate that the vehicle system 102 and/or vehicle 104 can recharge (e.g., increase the pressure within) the conduit 112 throughout all or a portion of the brake system 110 to at least a designated pressure in a shorter time period than a smaller effectiveness rating. A larger effectiveness rating may indicate that the brake system 110 can recharge the pressure in the conduit 112 to at least a threshold pressure (e.g., a pressure that is sufficiently large to permit the vehicle system 102 to begin moving again) in a shorter time period than a smaller effectiveness rating. Optionally, the effectiveness ratings may indicate other limitations or capabilities of the brake system 110, the vehicle 104, and/or the vehicle system 102.

At 602, one or more characteristics of a brake system can be determined. These characteristics can include air pressures inside the conduit 112 of the air brake system 110, air flows (e.g., rates of air movement) in the conduit 112, or other characteristics (e.g., temperatures, humidity, etc.). The characteristics can be measured by the sensors 206, 208 onboard one or more vehicles 104, 106 and reported to the monitoring system 100. In one embodiment, two different characteristics (e.g., air pressure and air flow rate) are measured.

In determining the effectiveness or effectiveness rating of the brake system 110, the characteristics can be determined responsive to application of the brake 204 or brake system 110. For example, after generating a brake application signal along the conduit 112 to slow or stop movement of the vehicle system 102, the pressure inside the conduit 112 may be lower than prior to generating the brake application signal and engaging the brake system 110. The brake system 110 can then close or attempt to close the valves 220 and may include one or more air compressors or other devices that add air to the conduit 112. The air is added in order to increase the pressure in the brake system 110 and to release the brakes 204 in the vehicles 104 and/or 106. The characteristics of the brake system 110 can be examined following application of the brake system 110 and/or during recharging of the brake system 110 in order to determine the effectiveness of the brake system 110.

At 604, one or more waveforms of one or more of these characteristics are determined. The waveforms may represent changes or variations in the characteristics with respect to time and/or distance along the route 114. The waveforms may be referred to as a characteristic waveforms that represents how the characteristics of the brake system 110 (e.g., air pressure, air flow rate, etc.) change with respect to time and/or distance. The waveforms may or may not be graphically presented (e.g., on the I/O device 210).

Figure 7:
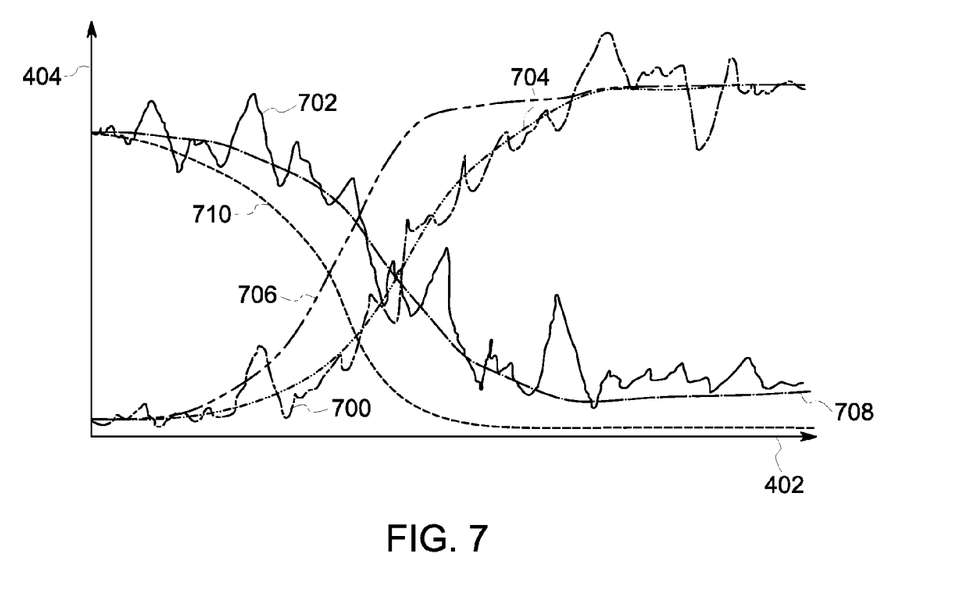
FIG. 7 illustrates examples of characteristic waveforms of the brake system shown in FIG. 1.

FIG. 7 illustrates examples of characteristic waveforms 700, 702 of the brake system 110 shown in FIG. 1. The waveforms 700, 702 are shown alongside the horizontal axis 402 and the vertical axis 404 described above. In one example, the waveform 700 may represent pressure measured in the conduit 112 at one or more locations along the length of the conduit 112 following (e.g., responsive to) application of the brake system 110 (e.g., during recharging of the brake system 110). The waveform 700 increases along the direction of the horizontal axis 402 due to the recharging causing an increase in pressure in the conduit 112. The waveform 702 may represent air flow measured in the conduit 112 at one or more locations along the length of the conduit 112 following (e.g., responsive to) application of the brake system 110 (e.g., during recharging of the brake system 110). The waveform 702 decreases along the direction of the horizontal axis 402 due to the recharging causing an increase in pressure in the conduit 112 and, therefore, reduced air flow in the conduit 112.

As shown in FIG. 7, the waveforms 700, 702 can include a significant amount of noise, or variations in the magnitude of the waveforms 700, 702 over relatively short lengths of the horizontal axis 402. This noise may interfere with determining the effectiveness of the braking system 110 without use of designated waveform signatures as the monitoring system 100 may be unable to accurately monitor performance of the braking system 110.

Returning to the description of the method 600 shown in FIG. 6, at 606, one or more designated waveform signatures are selected for comparing to one or more of the characteristic waveforms. As described above, several different waveform signatures may represent changes in characteristics (e.g., air pressures, air flow rates, temperatures, etc.) during recharging of the brake system 110 following a brake application. These waveform signatures can be associated with different vehicle conditions, different environmental conditions, and/or different locations within a vehicle system 102.

For a vehicle system 102 traveling along a route 114, the vehicle conditions of the vehicle system 102 and/or the environmental conditions can be determined. These conditions can then be compared to vehicle conditions and/or environmental conditions associated with different designated waveform signatures. The conditions associated with a designated waveform signature that match the conditions of the vehicle system 102 (or that match the conditions more closely than one or more, or all, other designated waveform signatures) may be selected as a selected waveform signature. If multiple characteristic waveforms are to be analyzed, then multiple waveform signatures can be selected. In one aspect, different designated waveform signatures may be selected for different locations of vehicles 104, 106 in the vehicle system 102, as described above.

With respect to the characteristic waveform 700 shown in FIG. 7, several different designated waveform signatures 704, 706 are shown alongside the horizontal and vertical axes 402, 404. The waveform signatures 704, 706 can be associated with different braking effectiveness or braking effectiveness ratings. For example, the waveform signature 704 may be associated with a smaller braking effectiveness rating relative to the waveform signature 706.

These waveform signatures 704, 706 also can be associated with sets of vehicle conditions and/or environmental conditions. These conditions can be used to determine which waveform signature to select for comparing to the characteristic waveform 700. In the illustrated example, the waveform signatures 704, 706 may be associated with the same vehicle conditions and/or environmental conditions, but different braking effectiveness ratings. While only two signatures 704, 706 are shown as being associated with the same vehicle conditions and/or environmental conditions, alternatively, a different number of the signatures may be used. Alternatively, a single waveform signature 704 or 706 may be associated with a unique set of vehicle conditions and/or environmental conditions. For example, the waveform signatures 704, 706 may be associated with different sets of vehicle conditions and/or environmental conditions. As described above, the waveform signatures may be determined based on measurements made in vehicle systems 102 having the vehicle conditions and/or exposed to the environmental conditions associated with the different waveform signatures.

With respect to the characteristic waveform 702 shown in FIG. 7, several different designated waveform signatures 708, 710 are shown alongside the horizontal and vertical axes 402, 404. In the illustrated example, the waveform signatures 708, 710 may be associated with the same vehicle conditions and/or environmental conditions, but different braking effectiveness ratings. While only two signatures 708, 710 are shown as being associated with the same vehicle conditions and/or environmental conditions, alternatively, a different number of the signatures may be used. Alternatively, a single waveform signature 708 or 710 may be associated with a unique set of vehicle conditions and/or environmental conditions. For example, the waveform signatures 708, 710 may be associated with different sets of vehicle conditions and/or environmental conditions. The waveform signatures 708, 710 may represent these air flow measurements, averages of the air flow measurements, medians of the air flow measurements, root mean squares of the air flow measurements, or the like. Alternatively, the air flow measurements used to generate the waveform signatures may be estimated, calculated, or otherwise modeled instead of being directly measured.

At 608, a determination is made as to whether or not the characteristic waveform of the vehicle system corresponds with the corresponding selected waveform signature. For example, the pressures represented by the characteristic waveform 700 may be compared to the pressures represented by the selected waveform signatures 704 and/or 706. If differences between the waveform and the waveform signatures are less than a threshold or if the magnitudes of the pressures represented by the characteristic waveform are within a range of the pressures of the selected waveform signature (e.g., within 1%, 3%, 5%, 10% or another value), then the characteristic waveform may correspond with the selected waveform signature.

If the waveform signature that corresponds with the characteristic waveform is associated with the same or increased braking effectiveness rating (e.g., relative to a designated value or a current value of the braking effectiveness), or with a braking effectiveness rating that is at least as large as a designated braking effectiveness rating, then the characteristic waveform may indicate that the braking effectiveness of the braking system 110 has not changed or has improved relative to a previous time. As a result, flow of the method 600 can return toward 602. On the other hand, if the characteristic waveform does not correspond with or match the waveform signature associated with the same, increased, or other braking effectiveness rating, then the characteristic waveform may indicate that the braking effectiveness of the braking system 110 has decreased. As a result, flow of the method 600 can proceed toward 610.

Alternatively, if the waveform signature that corresponds with the characteristic waveform is associated with a decreased braking effectiveness rating (e.g., relative to a designated value or a current value of the braking effectiveness), or with a braking effectiveness rating that is smaller than a designated braking effectiveness rating, then the characteristic waveform may indicate that the braking effectiveness of the braking system 110 has decreased or is less than the threshold braking effectiveness. As a result, flow of the method 600 can proceed toward 610. On the other hand, if the characteristic waveform does not correspond with or match the waveform signature associated with the decreased braking effectiveness, then the characteristic waveform may not indicate that the braking effectiveness of the braking system 110 has decreased. As a result, flow of the method 600 can return toward 602.

With respect to the example shown in FIG. 7, the differences between the pressure waveform 700 and the waveform signature 704 may be sufficiently small that the waveform 700 corresponds with or matches the waveform signature 704. The differences between the air flow waveform 702 and the waveform signature 708 may be sufficiently small that the waveform 702 corresponds with or matches the waveform signature 708. The differences between the pressure waveform 700 and the waveform signature 706 and the differences between the air flow waveform 702 and the waveform signature 710 may be large such that the pressure waveform 700 does not correspond with the waveform signature 706 and the air flow waveform 702 does not correspond with the waveform signature 710. The waveform signatures 706, 710 may represent larger braking effectiveness ratings than the signatures 704, 708. For example, the waveform signatures 706, 710 represent more rapid increases in pressure and decreases in air flow than the signatures 704, 708, which can indicate a more rapid recharging of the brake system 110 and, consequently, an increased braking effectiveness. As a result, flow of the method 600 can proceed to 610.

At 610, a decrease in the braking effectiveness rating of the braking system is identified. This decrease may be reported to an operator of the vehicle 104 or vehicle system 102, to the energy management system, to the controller of the vehicle 104, to an off-board location (e.g., a dispatch or repair facility), or elsewhere. In one embodiment, the decrease in the braking effectiveness of the braking system may be identified when different characteristics of the braking system indicate the decrease in effectiveness. For example, if both the air flow characteristics and the pressure characteristics indicate a decrease in braking effectiveness, then the decrease in the braking effectiveness rating of the braking system is identified. But, if one or more of the characteristics do not indicate the decrease, then the braking system may not be identified as having decreased effectiveness.

At 612, one or more remedial actions are taken in response to determining the decreased effectiveness of the braking system. As one example, at 612A, the timing of when a brake application signal is generated is modified. For example, due to the decreased effectiveness of the braking system 110 that was identified, the operator may direct the braking system 110 or controller to generate the brake application signal sooner (relative to a larger braking effectiveness rating) to ensure that the braking system 110 has sufficient distance to slow or stop movement of the vehicle system 102 or vehicle 104. The decreased braking effectiveness may be communicated to the operator via the I/O device. As another example, at 612B, the energy management system may change operational settings of a trip plan. The energy management system can create or revise a trip plan of the vehicle system 102 or vehicle 104 to direct the braking system 110 to generate the brake application signal at an earlier time (relative to a larger braking effectiveness rating) at one or more locations where the vehicle system 102 or vehicle 104 is to slow or stop. As another example, at 612C, a magnitude of a pressure reduction in the conduit that is used to generate a brake application signal may be changed. Due to the decrease in the braking effectiveness, a larger drop in pressure in the conduit 112 (e.g., the brake pipe) may need to occur in order to ensure that the brake application signal propagates through and is successfully received by the vehicles 104 and/or 106 in the vehicle system 102. For upcoming applications of the brake system 110, the pressure drop used to create the brake application signal may be increased relative to previous applications of the brake system 110 or relative to a designated value. Flow of the method 600 optionally may return to 602.

In one embodiment, different waveform signatures may be associated with faults of the braking system 110 and/or the vehicle system 102. For example, a waveform signature may be representative of performance of a braking system at a time prior to derailment of the vehicle system that includes the braking system and/or a mechanical decoupling of two or more vehicles of the vehicle system. Such a waveform signature may be obtained from measurements made onboard one or more vehicle systems that previously derailed and/or decoupled. For example, the waveform signatures 704, 708 may represent pressures and air flows measured or calculated for a vehicle system prior to derailment and/or decoupling of vehicles in the vehicle system. If the characteristic waveforms 700, 702 match the waveform signatures 704, 708 (e.g., if both match, if the pressure waveform matches, if the air flow waveform matches, and/or if another waveform matches), then the monitoring system 100 can determine that the vehicle system 102 is likely to derail and/or two or more vehicles 104 and/or 106 are likely to mechanically decouple from each other. As a result, a warning signal can be generated by the monitoring system 100 and communicated to the operator via the I/O device. Optionally, the warning signal can be communicated to the controller of the vehicle 104, which can then autonomously engage the brake system 110 to slow or stop movement of the vehicle system 102.

In one embodiment, a method (e.g., for monitoring a brake system) includes determining one or more characteristics of a conduit in a first air brake system of a first vehicle system, comparing the one or more characteristics of the first air brake system with one or more designated waveform signatures, and distinguishing between communication of a brake application signal that is propagated along the vehicle system through the conduit as a decrease in pressure in the conduit and a change in the pressure in the conduit that is not representative of the communication of the brake application signal based on comparing the one or more characteristics with the one or more designated waveform signatures.

In one aspect, determining the one or more characteristics can include measuring one or more of air pressure or air flow in the conduit.

In one aspect, determining the one or more characteristics can include measuring changes in air pressure in the conduit as a first characteristic of the conduit and measuring changes in air flow in the conduit as a second characteristic of the conduit. Comparing the one or more characteristics can include comparing the changes in the air pressure with a first waveform signature of the one or more designated waveform signatures and comparing the changes in the air flow with a second waveform signature of the one or more designated waveform signatures.

In one aspect, the one or more designated waveform signatures can include plural different waveform signatures associated with one or more of different vehicle conditions of the first vehicle system and/or different environmental conditions to which the first vehicle system is exposed.

In one aspect, the method also can include selecting a selected waveform signature from the plural different waveform signatures based at least in part on the one or more of the different vehicle conditions and/or the different environmental conditions. Comparing the one or more characteristics with the one or more designated waveform signatures can include comparing the selected waveform signature with the one or more characteristics.

In one aspect, determining the one or more characteristics can occur responsive to application of the first air brake system during the movement of the first vehicle system.

In one aspect, comparing the one or more characteristics of the first air brake system with the one or more designated waveform signatures can include comparing the one or more characteristics with plural different designated waveform signatures representative of different braking effectiveness ratings of the first air brake system. The method also may include determining a braking effectiveness rating of the first air brake system based on comparing the one or more characteristics with the different designated waveform signatures.

In one aspect, at least one of the designated waveform signatures represent one or more of air pressures and/or air flow rates in a second air brake system of a second vehicle system prior to at least one of a previous derailment or a previous mechanical decoupling of the second vehicle system. The method also can include predicting one or more of derailment and/or mechanical decoupling of the first vehicle system based on comparing the one or more characteristics of the conduit in the first air brake system with the one or more designated waveform signatures.

In another embodiment, a system (e.g., a brake monitoring system) includes one or more processors configured to determine one or more characteristics of a conduit in a first air brake system of a first vehicle system and to compare the one or more characteristics of the first air brake system with one or more designated waveform signatures. The one or more processors also can be configured to distinguish between communication of a brake application signal that is propagated along the vehicle system through the conduit as a decrease in pressure in the conduit and a change in the pressure in the conduit that is not representative of the communication of the brake application signal based on comparing the one or more characteristics with the one or more designated waveform signatures.

In one aspect, the one or more processors can be configured to determine the one or more characteristics based on one or more of air pressure and/or air flow in the conduit.

In one aspect, the one or more processors can be configured to determine the one or more characteristics by determining changes in air pressure in the conduit as a first characteristic of the conduit and determining changes in air flow in the conduit as a second characteristic of the conduit. The one or more processors can be configured to compare the one or more characteristics by comparing the changes in the air pressure with a first waveform signature of the one or more designated waveform signatures and comparing the changes in the air flow with a second waveform signature of the one or more designated waveform signatures.

In one aspect, the one or more designated waveform signatures can include plural different waveform signatures associated with one or more of different vehicle conditions of the first vehicle system and/or different environmental conditions to which the first vehicle system is exposed.

In one aspect, the one or more processors can be configured to select a selected waveform signature from the plural different waveform signatures based at least in part on the one or more of the different vehicle conditions or the different environmental conditions. The one or more processors can be configured to compare the one or more characteristics with the one or more designated waveform signatures by comparing the selected waveform signature with the one or more characteristics.

In one aspect, the one or more processors can be configured to determine the one or more characteristics responsive to application of the first air brake system during the movement of the first vehicle system.

In one aspect, the one or more processors can be configured to compare the one or more characteristics of the first air brake system with the one or more designated waveform signatures by comparing the one or more characteristics with plural different designated waveform signatures representative of different braking effectiveness ratings of the first air brake system. The one or more processors also can be configured to determine a braking effectiveness rating of the first air brake system based on comparing the one or more characteristics with the different designated waveform signatures.

In one aspect, at least one of the designated waveform signatures can represent one or more of air pressures and/or air flow rates in a second air brake system of a second vehicle system prior to at least one of a previous derailment or a previous mechanical decoupling of the second vehicle system. The one or more processors can be configured to predict one or more of derailment or mechanical decoupling of the first vehicle system based on comparing the one or more characteristics of the conduit in the first air brake system with the one or more designated waveform signatures.

In another embodiment, a method (e.g., for monitoring a brake system) includes monitoring changes in air pressure and changes in air flow in a conduit of an air brake system of a vehicle system having two or more vehicles coupled with each other, comparing the changes in the air pressure with one or more designated pressure waveform signatures and comparing the changes in the air flow with one or more designated air flow waveform signatures, determining a braking effectiveness of the air brake system based at least in part on comparing the changes in the air pressure with the one or more designated pressure waveform signatures and comparing the changes in the air flow with the one or more designated air flow waveform signatures, and modifying operation of the vehicle system in response to determining a change in the braking effectiveness of the air brake system.

In one aspect, the method also can include selecting the one or more designated pressure waveform signatures from among plural different designated pressure waveform signatures and selecting the one or more designated air flow waveform signatures from among plural different designated air flow waveform signatures based on a comparison between one or more of an actual vehicle condition of the vehicle system and/or an actual environmental condition to which the vehicle system is exposed with one or more vehicle conditions and/or environmental conditions associated with the different designated pressure waveform signatures and associated with the different designated air flow waveform signatures.

In one aspect, modifying the operation of the vehicle system can include directing an operator to increase a pressure drop in the conduit used to generate a brake application signal, directing a controller of the vehicle system to autonomously increase the pressure drop in the conduit used to generate the brake application signal, and/or changing operational settings designated by a trip plan of the vehicle system. The trip plan can designate the operational settings of the vehicle system as a function of one or more of time and/or distance along a route.

In one aspect, at least one of the designated pressure waveform signatures and/or the designated air flow waveform signatures can represent one or more of air pressures and/or air flow rates associated with at least one of a derailment and/or a mechanical decoupling. The method also can include predicting one or more of derailment and/or mechanical decoupling of the vehicle system based on comparing the changes in the air pressure with the one or more designated pressure waveform signatures and comparing the changes in the air flow with the one or more designated air flow waveform signatures.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the Figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A method comprising:
monitoring changes in air pressure and changes in air flow in a conduit of an air brake system of a vehicle system having two or more vehicles coupled with each other;
selecting one or more designated pressure waveform signatures from among plural different designated pressure waveform signatures and selecting one or more designated air flow waveform signatures from among plural different designated air flow waveform signatures based on a comparison between one or more of an actual vehicle condition of the vehicle system or an actual environmental condition to which the vehicle system is exposed with one or more vehicle conditions or environmental conditions associated with the different designated pressure waveform signatures and associated with the different designated air flow waveform signatures, wherein the actual vehicle condition includes one or more of a length of the vehicle system, a type of the air brake system, or a type of valve in the air brake system;
comparing the changes in the air pressure with one or more designated pressure waveform signatures and comparing the changes in the air flow with one or more designated air flow waveform signatures;
determining a braking effectiveness of the air brake system based at least in part on comparing the changes in the air pressure with the one or more designated pressure waveform signatures and comparing the changes in the air flow with the one or more designated air flow waveform signatures, wherein the braking effectiveness represents one or more of a speed at which the vehicle system can travel while stopping within a designated distance, a distance in which the vehicle system can stop while moving at a designated speed, or a time period in which the air brake system can increase pressure inside the conduit to a designated pressure; and modifying operation of the vehicle system in response to determining a change in the braking effectiveness of the air brake system.

2. The method of claim 1, wherein modifying the operation of the vehicle system includes directing an operator to increase a pressure drop in the conduit used to generate a brake application signal, directing a controller of the vehicle system to autonomously increase the pressure drop in the conduit used to generate the brake application signal, or changing operational settings designated by a trip plan of the vehicle system, the trip plan designating the operational settings of the vehicle system as a function of one or more of time or distance along a route.

3. The method of claim 1, wherein at least one of the designated pressure waveform signatures or the designated air flow waveform signatures represents one or more of air pressures or air flow rates associated with at least one of a derailment or a mechanical decoupling, and further comprising predicting one or more of derailment or mechanical decoupling of the vehicle system based on comparing the changes in the air pressure with the one or more designated pressure waveform signatures and comparing the changes in the air flow with the one or more designated air flow waveform signatures.

4. The method of claim 1, wherein the actual environmental condition includes one or more of an ambient temperature, a temperature inside the conduit of the air brake system, or an ambient humidity.

* * * * *